FIG 1

Feb. 5, 1963 R. C. SCHLICHTIG 3,076,316
REVERSIBLE HEAT ENGINES
Filed July 15, 1960 7 Sheets-Sheet 2

INVENTOR.
RALPH C. SCHLICHTIG
BY

ATTORNEY

Feb. 5, 1963 R. C. SCHLICHTIG 3,076,316
REVERSIBLE HEAT ENGINES
Filed July 15, 1960 7 Sheets-Sheet 6

INVENTOR.
RALPH C. SCHLICHTIG
BY
ATTORNEY

United States Patent Office 3,076,316
Patented Feb. 5, 1963

3,076,316
REVERSIBLE HEAT ENGINES
Ralph C. Schlichtig, 11212 3rd S., Seattle 88, Wash.
Filed July 15, 1960, Ser. No. 43,179
8 Claims. (Cl. 60—59)

This invention relates to a new and improved heat engine which utilizes gas as the main thermodynamic substance, and which is so devised that it will function with low grade heat and with small temperature differentials.

The subject application is a continuation-in-part application of application Serial Number 829,905, now abandoned, entitled Reversible Heat Engines, filed July 27, 1959, by Ralph C. Schlichtig, the applicant in the subject application.

As is well known, conventional steam engines utilize saturated or superheated steam as the working substance. However, this has certain disadvantages. For instance, the temperature of the steam boiler must be above the normal boiling point of water, thus requiring a relatively high grade of heat. In addition, conventional steam engines in order to obtain high efficiency must utilize a condenser. In operation, this condenser must be evacuated of air at all times, a condition oftentimes difficult to maintain. Further, the normal steam engine operates at relatively high pressures and temperatures, thus requiring high strength components and good insulation. This makes it extremely costly to construct a steam engine which will operate from salt water.

Heat engines using air as a working substance have been built with the usual disadvantage of being very bulky. Their efficiency is usually so low that successful operation requires that heat be supplied at high temperatures. Such prior art heat engines usually have the additional problem of lubrication because of sliding parts.

Attempts have been made to build heat engines with large air handling capacity through employment of rotors with fixed vanes and in which pressure recovery has been attempted by means of a plurality of equalizer tubes interconnecting successive high pressure intervanes compartments with successsive low pressures intervane compartments. However, an equalizer tube will not recover in excess of fifty percent of the pressure energy if there are no leakage or friction losses. In practice, an increase in the number of these prior art equalizer tubes requires a multiplication of time for rotation of the rotor by the number of equalizer tubes used. This results in a proportional increase in machine bulkiness and in volume leakage, so that leakage becomes a predominate loss. In accordance with one of the teachings of this invention the provision of a single pressure inverter tube eliminates this difficulty.

Therefore, an object of this invention is to provide in a gas type heat engine, operating with small differences in the tempertaure of the gas, means for handling large volumes of gas with a minimum of leakage and friction losses, to thereby obtain a maximum of useful power.

Another object of this invention is to provide in a heat engine means for recovering mechanical power by the evaporation of a liquid in the presence of an unsaturated enclosed gas which may be at a temperature considerably below the normal boiling point of the associated liquid.

A further object of this invention is to provide a heat engine which can successfully operate by evaporating salt water.

Still another object of this invention is to provide an internal heat engine which can utilize wet or otherwise poor quality solid fuel or a chemical heat source.

Still another object of this invention is to recover power from the exhaust gas of a steam engine or internal combustion engine. It may do this by functioning as a supercharger.

Other objects of this invention will become apparent when taken in conjunction with the accompanying drawings in which.

Figure 1:
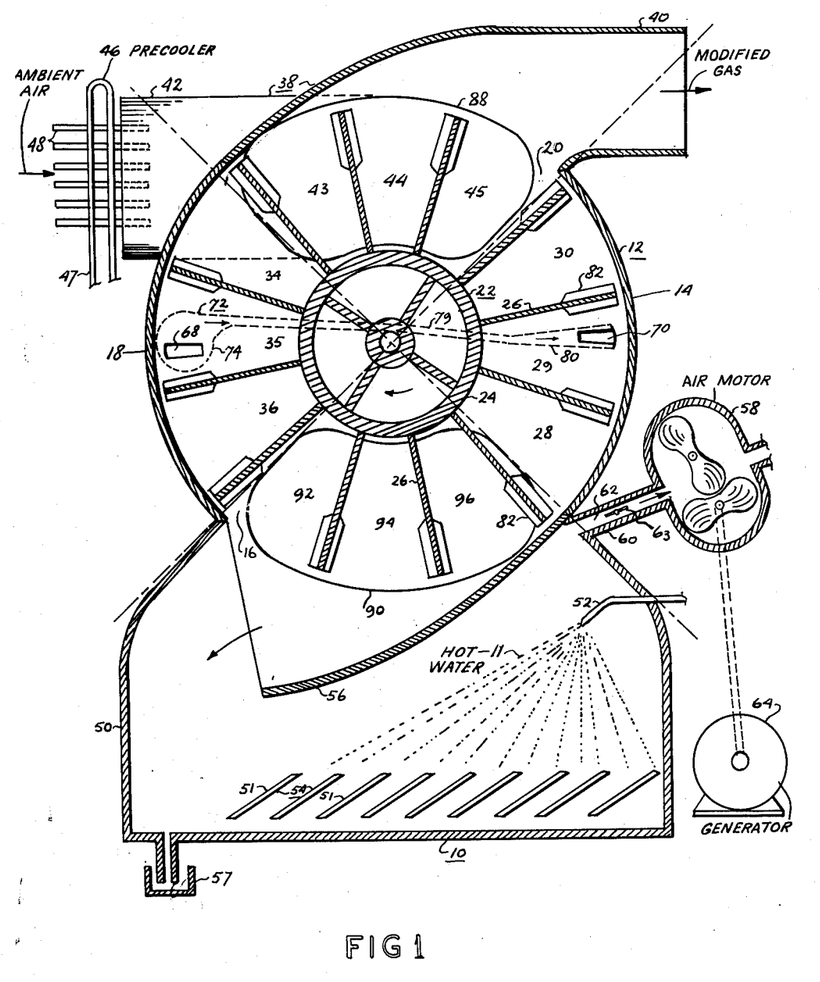
FIG. 1 is a schematic diagram of a heat engine embodying teachings of this invention and in which means is provided for recovering mechanical power by the evaporation of a liquid in the presence of enclosed gas which may be at a temperature considerably below the boiling point of the associated liquid.
Figure 2:
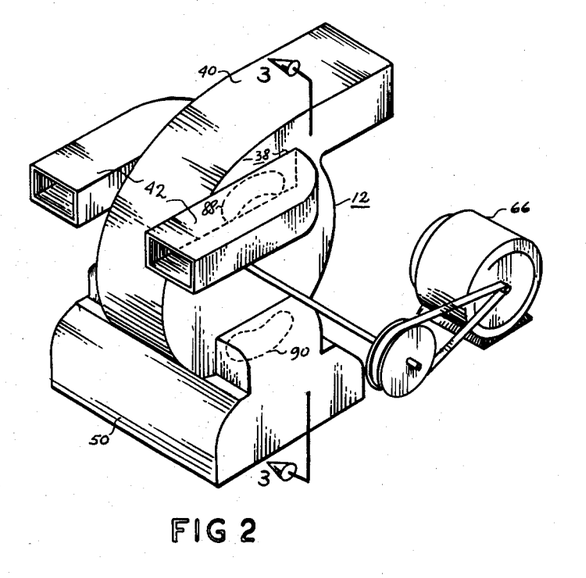
FIG. 2 is an isometric view of the heat engine shown in FIG. 1.
Figure 3:
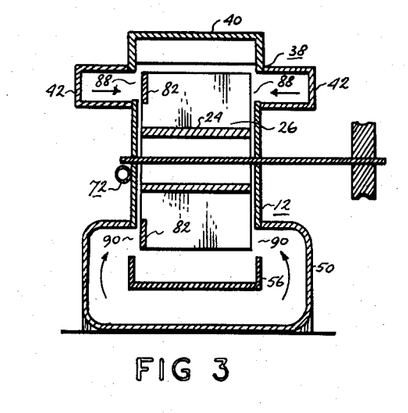
FIG. 3 is a cross section view of the heat engine shown in FIG. 2 taken along the lines 3—3.

Referring to FIGS. 1 through 3 there is shown a heat engine 10 in which means is provided for recovering mechanical power by the evaporation of a liquid 11 in the presence of enclosed gas at moderate temperature. As will be explained more clearly hereinafter, the liquid 11 may be heated water, liquid fuel, or liquid chemical absorbent.

In general, the heat engine 10 comprises a rotor housing 12 having consecutively a closed first sector portion 14 which is the closed portion of the housing 12 shown at the right in FIG. 1, an open second sector portion 16 which is the open portion of the housing 12 shown at the bottom in FIG. 1, a closed third sector portion 18 which is the closed portion of the housing 12 at the left in FIG. 1 and which is oppositely disposed from the first closed sector portion 14, and an open fourth sector portion 20 which is the open portion of the housing 12 shown at the top in FIG. 1. The rotor housing 12 is disposed around a rotor 22 having a hub 24 and a plurality of equally spaced vanes 26, which are fixed to the hub 24 and extended radially out therefrom so that there are at all times at least two of the vanes 26 in each of the four sector portions 14, 16, 18 and 20. Thus, the sector portions 14, 16, 18 and 20 combined represent the volume swept out by one of the vanes 26 upon one revolution of the rotor 22. In practice, the rotor 22 and the associated parts are so constructed as to have a minimum of transfer of heat between the rotor 22 and the associated gas. The housing 12 is so disposed around the rotor 22 as to be in close proximity to all of the peripheral edges of the vanes 26 as they come into the first and third sector portions 14 and 18, respectively, of the rotor housing 12, to thus successively establish isolated incoming intervane compartments 28, 29 and 30 and outgoing intervane compartments 34, 35 and 36. By close proximity to all of the outer edges of the vanes 26 it is meant a very few thousandths of an inch clearance.

In order to discharge the changed gas contained within the outgoing intervane compartments 34, 35 and 36 to ambient space and in order to obtain a new charge of gas from the ambient space, an ambient manifold 38 is connected to the open fourth sector portion 20 of the rotor housing 12. In particular, the ambient manifold 38 comprises a scroll case 40 for deflecting the changed gas from the outgoing intervane compartments 34, 35 and 36, and a pair of intake ducts 42 for receiving a new charge of gas from the ambient space and directing it into the intervane compartments 43, 44 and 45 of the rotor 22.

For the purpose of precooling the ambient gas received from the ambient space before it passes into the intervane compartments 43, 44 and 45, a precooler 46 is disposed at the receiving end of each of the intake ducts 42. As shown, the precooler 46 comprises a coil 47 for receiving coolant and radiating fins 48 attached to the coil 47 for absorbing and transferring heat. However, it is to be understood that other types of precooling devices (not shown) could be substituted for the precooler 46.

A sealed heat exchanger enclosure 50 is suitably connected to the rotor housing 12 at the open second sector portion 16 in order to provide a pressure isolated enclosure for receiving the gas from the incoming intervane compartments 28, 29 and 30. For the purpose of providing evaporating surfaces 51 for the liquid 11 received from a spray device 52, a heat exchanger 54 is disposed within and suitably secured to the enclosure 50. In practice, the heat exchanger 54 may be constructed from inert material such as stone. On the other hand, in order to deflect the gas received from the incoming intervane compartments 28, 29 and 30 onto the evaporating surfaces 51, a deflecting scroll case 56 is suitably secured to the rotor housing 12 and positioned as shown. A sump and trap 57 is so connected to the enclosure 50 that it receives surplus liquid from within the enclosure 50 without permitting gas to escape or enter the enclosure 50. Heat is supplied to the gas within the enclosure 50 by latent heat of the liquid from the spray device 52.

As illustrated, an air motor 58 is suitably secured to the enclosure 50 by means of an air duct 60 having a passageway 62 which is in communication with the interior of the enclosure 50 so that the air motor 58 is responsive to the pressure difference between ambient space and the space within the enclosure 50. However, it is to be understood that other suitable conventional air motors (not shown) could be substituted for the air motor 58. As shown, a butterfly valve 63 is disposed within the passageway 62 and functions to control the flow of air or gas through the passageway 62. A dynamo-electric machine or generator 64 may be mechanically connected to the air motor 58 as shown as a means of transmitting power to a load (not shown). In practice, part of the power output from the air motor 58 may be utilized to drive the rotor 22.

In order to enable adiabatic expansion of the gas disposed within the outgoing intervane compartments 34, 35 and 36, a port 68 is disposed in the closed third sector portion 18 of the rotor housing 12. In order to simultaneously enable adiabatic compression of the gas disposed within the incoming intervane compartments 28, 29 and 30, port 70 is provided in the rotor housing 12 at the oppositely disposed closed first sector portion 14.

In accordance with this invention, an interconnecting pressure inverter member 72, constructed in the form of a unidirectional venturi is interconnected between the ports 68 and 70. As illustrated, the eccentric intake section 74, of the member 72, converges eccentrically with respect to the port 68 into a central section 79. In practice, the intake section 74, of the member 72, is suitably sealed to the rotor housing 12 so as to prevent the leakage of gas from the outgoing intervane compartments 34, 35 and 36 to ambient space.

The outgoing discharge section 80 of the member 72, is highly streamlined and is suitably sealed to the rotor housing 12 so as to permit the recovery of kinetic energy of the gas flowing throuugh the interconnecting member 72 as pressure energy, to thus effect adiabatic compression of gas within the incoming intervane compartments 28, 29 and 30.

More than one pressure inverter member, such as the member 72, may be used in parallel if they interconnect identical intervane compartments and function simultaneously as a single pressure inverter member.

Port cover tabs or closing members 82 are suitably secured to an edge of each of the vanes 26 in order to simultaneously cover and effectively seal the ports 68 and 70 and prevent direct passage of gas from adjacent intervane compartments during the time that vanes 26 are passing over the ports 68 and 70.

The cycle of operation of the heat engine 10 as illustrated in FIGS. 1 through 3 will now be described assuming the liquid 11 is heated water. Air from ambient space passes over the precooler 46 where its density is increased by cooling. This air of increased density then passes through both of the intake ducts 42 and enters the intervane compartments 43, 44 and 45 through an opening 88, thus replacing the air already present in the intervane compartments 43, 44 and 45. The replaced air is removed from the intervane compartments 43, 44 and 45 by virtue of the increasing radius of the deflecting scroll case 40 which compels the air to follow its expanding contour. Upon clockwise rotation of the rotor 22 by means of the motor 66, the air of increased density is carried by the rotor 22 until it is discharged into the sealed heat exchanger enclosure 50 by the action of the deflecting scroll case 56. The deflected gas of increased density then impinges upon the evaporating surfaces 51 where its pressure-volume product is increased by receiving water vapor from the heated water 11 and its temperature is raised by the heat from the heated water 11. The evaporator surfaces 51 are kept supplied with heat and moisture by means of the spray device 52 which directs the heated water onto the evaporator surfaces 51. Excess water is allowed to escape through the sump and trap 57.

A portion of the gas of increased pressure then flows through the intake openings 90 into the intervane compartments 92, 94 and 96, to thus replace in equal volume the gas of increased density that had been previously discharged into the enclosure from the intervane compartments. With the butterfly valve 63 open as shown in FIG. 1 of the drawings, the remaining portion of expanded gas of increased pressure flows through the passageway 62, to thus effect a rotation of the air motor 58, which in turn may drive a dynamo-electric machine 64 or any other useful load. The output power from the dynamo-electric machine 64 can be utilized to energize the motor 66, the excess power being utilized to energize other useful loads (not shown).

Figure 7A:
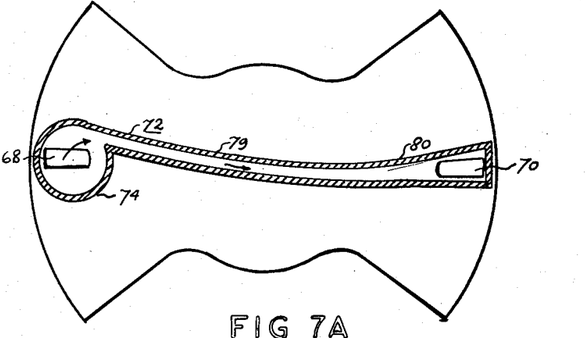
FIGS. 7A and 7B are enlarged views of the venturi pressure inverter interconnecting member shown in FIGS. 1, 3 and 4 in which the flow of gas through the member and the manner in which back flow is prevented is illustrated.
Figure 7B:
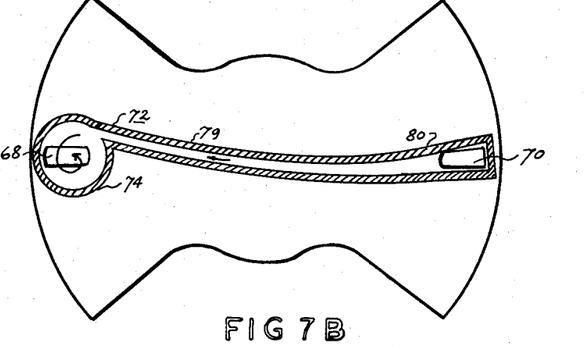

Upon further rotation of the rotor 22 in the clockwise direction, the gas of increased pressure disposed within the intervane compartments 92, 94 and 96, is carried upwards until said gas within the intervane compartment 92 comes into the space corresponding to the outgoing intervane compartment 35 and in communication with the port 68, at which time a portion of this gas of increased pressure enters the port 68 and is accelerated as it enters the central section 79. Thus the pressure energy of gas leaving the port 68 is converted into kinetic energy in the central section 79, of the interconnecting member 72. As this portion of gas passing through the central section 79 enters the diverging outgoing discharge section 80 (as shown in FIG. 7A), the kinetic energy is again converted into pressure energy to raise the pressure of air in the incoming intervane compartment 29. Therefore, the gas within the outgoing intervane compartment 35 undergoes adiabatic expansion to produce adiabatic compression of the gas in the incoming intervane compartment 29. In practice, the pressure inverter member 72 is designed large enough so that the adiabatic inversion of pressure between the gas in the outgoing intervane compartment 35 and the gas in the incoming intervane compartment 29 will take place completely within the time that the incoming intervane compartment 29 is in communication with the port 70. During the first half of this pressure-inversion cycle the pressure of the gas in the outgoing intervane compartment 35 is greater than the gas disposed within the incoming intervane compartment 29. The pressure difference causes the kinetic energy of the gas flowing in the central section 79 to increase. Thus, at the middle of the pressure-inversion cycle the pressure of the gas disposed within the incoming intervane compartment 29 becomes substantially equal to the pressure of the gas disposed within the outgoing intervane compartment 35. Then during the second half of the pressure-inversion cycle the inertia of the gas within the central section 79 of the pressure inverter member 72 causes gas to continue to flow from the outgoing intervane compartment 35 to the incoming intervane compartment 29 even though the pressure of the gas disposed within the outgoing intervane compartment 35 becomes lower than the pressure of the gas disposed within the incoming intervane compartment 29 due to overshooting. After the completion of the pressure-inversion cycle, the flow of any substantial gas in the reverse direction through the pressure inverter member 72 toward the port 68 is prevented by the cyclonic effect in the eccentric intake 74 of the pressure inverter member 72. This blocking action can be seen form FIG. 7B. If it is assumed that a small amount of gas after the completion of the pressure-inversion cycle does go backwards in the direction from right to left, as shown, then gas in the eccentric intake section 74 rotates cyclonically as shown in FIG. 7B. As gas moves from the periphery of the rotating mass into the center to enter the port 68, conservation of angular momentum demands a rotation of much higher speed as in the case of cyclones. The high angular speed of rotation sets up a centrifugal reaction which prevents gas from flowing into the center and out through the port 68.

The gas which was increased in density by the precooler 46 is thus further increased in density and in pressure by action of the pressure inverter member 72 and this gas of further increased density within the incoming intervane compartment 29 is carried down, upon further rotation of the rotor 22, and discharged into the sealed heat exchanger enclosure 50. The pressure-volume product of the gas within the sealed heat exchanger enclosure 50 is thus conserved.

Figure 9A:
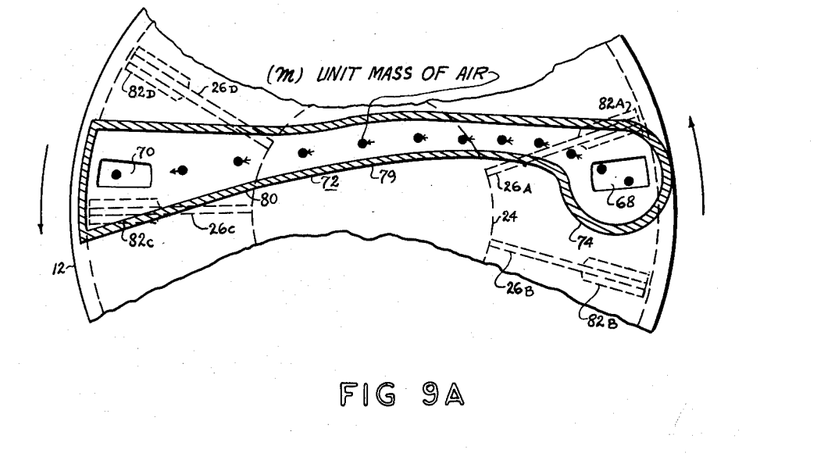
Figure 9B:
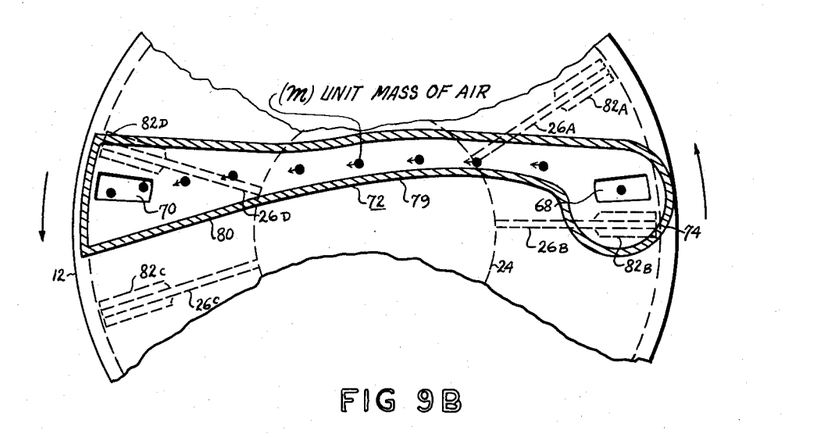

FIGS. 9A and 9B, relative to apparatus similar to that shown in FIGS. 1 through 3, further illustrate the cycle of pressure inversion hereinbefore described when the interconnecting member 72 is in communication with one pair of intervane compartments. As can be seen from FIGS. 9A and 9B the outgoing intervane compartment is bounded by the hub 24, the rotor housing 12 and vanes 26A and 26B which carry closing members 82A and 82B, respectively, while the incoming intervane compartment is bounded by the hub 24, the rotor housing 12 and vanes 26C and 26D which carry closing members 82C and 82D, respectively. It is to be noted that since FIGS. 9A and 9B illustrate the apparatus when viewed from the interconnecting member side, the direction of rotation of the hub 24 and associated vanes 26A, 26B, 26C and 26D is opopsite to that shown in FIG. 1 in which the apparatus is viewed from the side opposite the interconnecting member 72.

Referring to FIG. 9A, the first half of the pressure inversion cycle begins as closing members 82A and 82C uncover ports 68 and 70, respectively, thus placing the outgoing intervane compartment defined by vanes 26A and 26B in communication with the incoming intervane compartment defined by vanes 26C and 26D by way of the interconnecting member 72. The close spacing of circular dots $m$ at the outgoing intervane compartment end of the interconnecting member 72 illustrates that the air is more compressed here than at the incoming intervane compartment end where the circular dots $m$ are farther spaced. Each circular dot $m$ represents a unit mass of air. As the air pressure as illustrated is greater at port 68 than at port 70, there is a force acting on each mass $m$ of air in the interconnecting member 72. These forces are shown as acting on each mass $m$ of air by respective arrows directed toward the circular dots. The air masses $m$ are thus accelerated in the direction of the forces until a maximum velocity is reached at the middle of the pressure-inversion cycle. The time of a half-cycle is short so that only a limited amount of air leaves the interconnecting member 72 at port 70. But any mass before so leaving the interconnecting member 72 must transfer its kinetic energy to the remaining air in the central section 79 of the interconnecting member 72 by being decelerated by the divergence of the outgoing divergent discharge section 80. This is the well known venturi action. By the middle of the pressure inversion cycle the air pressure of the interconnected intervane compartments has reached equilibrium and the forces on the air masses within the central section 79 have decreased to zero. But by this time the masses $m$ in the central section 79 of the interconnecting member 72 have reached maximum velocity and thus maximum kinetic energy.

FIG. 9B illustrates the second half of the pressure inversion cycle. Here the air masses $m$ in the central section 79 of the interconnecting member are being decelerated. Their inertia then cause them to exert forces against the air between them and port 70. These forces that the air masses $m$ exert are shown by arrows leading from each circular dot $m$. The total force due to the inertia and kinetic energy of the air masses $m$ in the interconnecting member results in compressing the air in the incoming intervane compartment defined by vanes 26C and 26D while the air pressure is reduced in the outgoing intervane compartment defined by vanes 26A and 26B until all the stored energy of the air mass in the interconnecting member 72 is expended at the close of the cycle. At the close of the cycle the ports 68 and 70 are closed by the closing members 82B and 82D, respectively.

As the gas of further increased density is carried down and discharged into the sealed heat exchanger enclosure 50, and gas of increased pressure is carried by the rotor 22 until it comes into communication with the port 68, the above described action is repeated. The remaining gas which does not pass into the port 68 is carried upward and is discharged out through the radially diverging scroll case 40 to ambient space.

In practice, the heat engine 10 is so constructed and the rotor 22 is driven at such a speed that the hereinbefore described pressure-inversion cycle can be completed in the time of passage of one intervane compartment, of the rotor 22, from one position to the adjacent position. The precooling heat exchange 46 may be omitted with some loss of power.

In operation, if the liquid 11 is a liquid fuel, the same cycle of operation takes place as hereinbefore described with reference to FIGS. 1 through 3 when the liquid was heated water, except that in the case of liquid fuel, heat of combustion of the liquid fuel 11 is the source of heat for increasing the temperature of the gas, specifically air, received into the enclosure 50 from the rotor 22. In the case of the liquid 11 being liquid fuel, the heat exchanger 54 may be eliminated provided the liquid fuel 11 is sufficiently volatile. The greater part of the combustion products can be directed to leave the enclosure 50 by way of the air motor 58.

In operation, if the liquid 11 is a liquid chemical absorbent such as calcium-chloride solution which liberates heat when absorbing water vapor from the air passing through the enclosure 50, the same cycle of operation takes place as hereinbefore described with reference to FIGURES 1 through 3 when the liquid 11 was heated water, except that in the case of liquid chemical absorbent gas that comes into the enclosure 50 from the rotor 22 contains a gaseous or vapor component soluble in the liquid absorbent 11 and such that heat is liberated in the process of absorption. The resulting liquid containing the absorbed gas is removed through the trap 57. Here as in the previous case, the precooler 46 may be omitted with some resulting loss of power.

Figure 4:
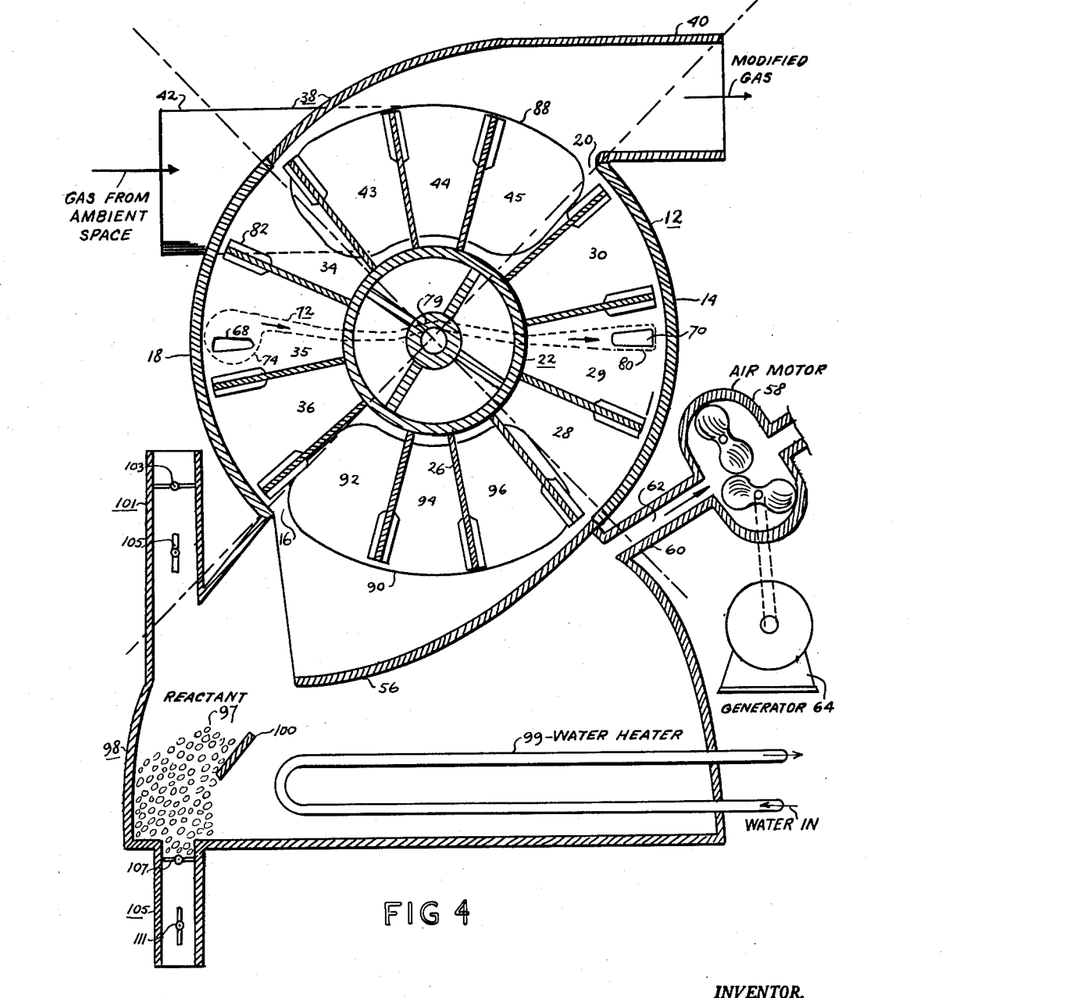
FIG. 4 is a schematic diagram of an internal chemical reactant heat engine embodying still further teachings of this invention and in which means is provided for obtaining power by internal heat from chemical action such as combustion or chemical absorption. It also represents a supercharger engine combination in which the sealed enclosure is the combustion chamber of a conventional heat engine.

FIGURE 4 illustrates another embodiment of the teachings of this invention in which power is derived by expansion of gas within a confined space where expansion is caused by combustion of a solid reactant 97 within the same confined space, and from which surplus heat can be withdrawn for other useful purposes. A heat exchanger 99 illustrates a typical means of removing surplus heat to generate steam within the exchanger. However, other means (not shown) could be substituted for the heat exchanger 99 in order to remove surplus heat from within the confined space. An entire sealed reaction chamber and heat exchanger enclosure 98 may be the combustion chamber of a conventional heat engine (not shown). The reactant 97 may be either a solid fuel or a chemical absorbent which liberates heat while absorbing a component of the gas circulated by rotor 22. Like components of FIGURES 1 through 4 have been given the same reference characters.

Specifically in operation gas from ambient space passes into intake ducts 42 and intervane compartments 43, 44 and 45 through opening 88. This gas replaces the heated and modified gases previously disposed within the intervane compartments 43, 44 and 45. The modified gases are subsequently discharged to ambient space by the action of the rotor 22 and the influence of the radially expanding deflecting scroll case 40. The fresh ambient gas disposed within the intervane compartments 43, 44 and 45, upon rotation of the rotor 22 in a clockwise direction, is carried downward until the gas within the intervane compartment 45 comes into the position of the incoming intervane compartment 29 and into communication with the port 70, at which time it is adiabatically compressed. As the gas carried downward by action of rotor 22 is removed from the intervane compartments 92, 94 and 96 it is deflected into the sealed reaction chamber and heat exchanger enclosure 98 by the diverging scroll case 56. Here reaction between the reactant 97 and the gas within the enclosure 98 takes place with resulting heating and expansion of the modified gas under increased pressure. This latter reaction may be an absorption process such as silica-gel absorbing water vapor or a normal combustion process, depending upon whether the reactant 97 is a chemical absorbant or a combustible fuel. Excess heat, due to the reaction, that is more than necessary to heat the air is removed by means of the heat exchanger 99, which can be a water boiler tube having therein water that in operation of the heat engine of FIG. 4 is converted to steam.

The reactant 97, which may be a solid fuel or a chemical absorbent, enters the reaction chamber 98 by means of the air lock 101 and flows past the valves 103 and 105 which are opened only one at a time. Unconsumed solids are disposed of through the lower air lock 105 housing the two valves 107 and 111 which are opened only one at a time.

The volume of modified gas in excess of the volume of incoming gas received from the intervane compartments 92, 94 and 96 is transmitted outward through the passageway 60 to their air motor 58 where power is developed to drive the useful load 64.

Upon further rotation of the rotor 22 in a clockwise direction, the modified gas from within the sealed enclosure 98 enters the intervane compartments 92, 94 and 96, through the openings 90, to replace the compressed ambient gas being discharged into the sealed enclosure 98. The modified gas within the intervane compartments 92, 94 and 96 is then carried upward, as shown, until it comes into communication with the port 68 at which time the modified gas is adiabatically expanded.

Beginning at the instant port cover tab 82 passes from over port 68, a portion of the modified gas within intervane compartment 35 moves at high velocity through the central section 79 of the interconnecting member 72. The inertia of the gas carries it onward past the stage at which the pressure within the intervane compartments 35 and 29 are equal. Thus the gas within the intervane compartment 29 is adiabatically compressed.

Figure 5:
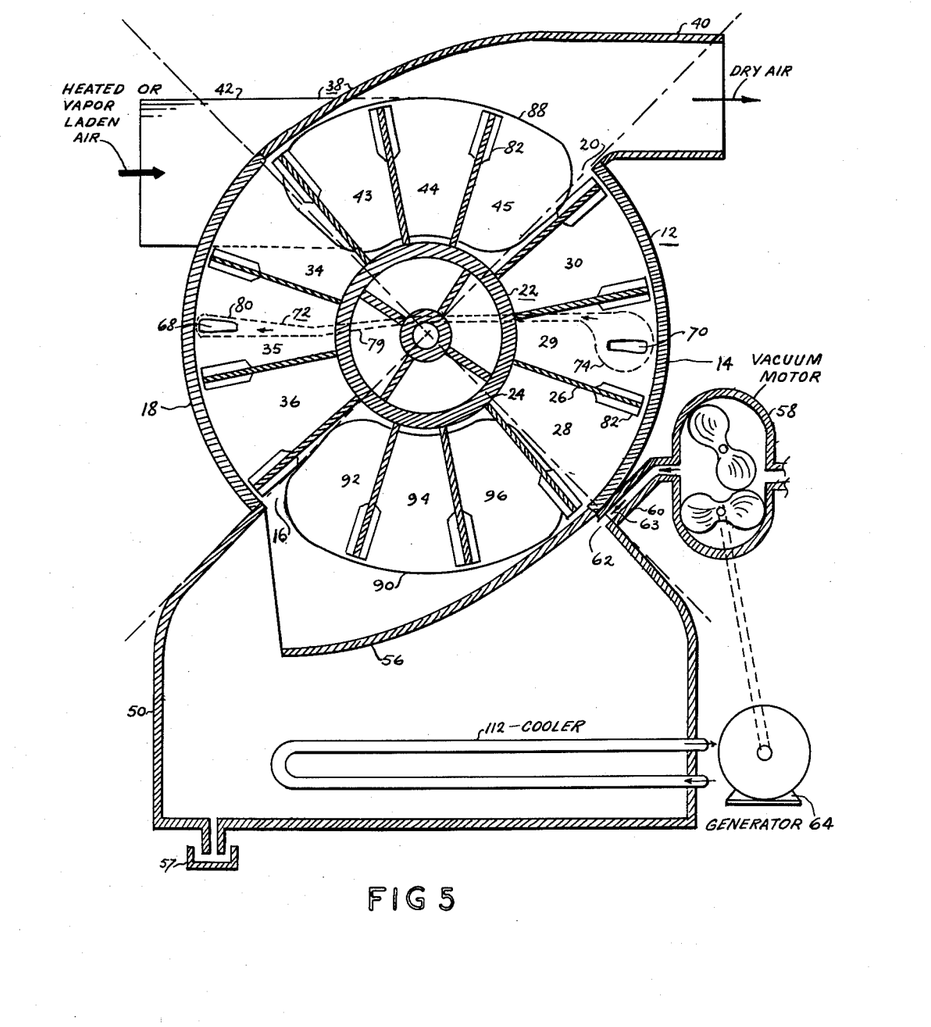
FIG. 5 is a schematic diagram of a heat engine embodying still other teachings of this invention and in which means is provided for obtaining power by cooling or dehydrating air by use of a heat exchanger.

Referring to FIG. 5 there is illustrated still another embodiment of this invention in which like components of FIGS. 1 through 3 and FIG. 5 have been given the same reference characters. The main distinction between the apparatus of FIGS. 1 through 3 and FIG. 5 is that in the apparatus of FIG. 5 vacuum is maintained in the enclosure 50 by a heat exchanger 112 having cold water running therethrough to cool the air within the enclosure 50. Also the pressure inverter member 72 is reversed from that shown in FIG. 1

Specifically, in operation heated and/or vapor laden air passes into the intervane compartments 43, 44 and 45 through intake ducts 42 to replace outgoing cool dehydrated air previously disposed within the intervane compartments 43, 44 and 45. Upon rotation of the rotor 22 in the clockwise direction the vapor laden air within the intervane compartments 43, 44 and 45 is successively adiabatically expanded as it comes into communication with the port 70 and a portion of this vapor laden air flows through the pressure inverter member 72 to successively produce adiabatic compression of the outgoing dry air disposed within the outgoing intervane compartments 34, 35 and 36 as hereinbefore explained.

The adiabatically expanded heated and/or vapor laden air is carried by the rotor 22 and is discharged into the sealed heat exchanger enclosure 50, where it is deflected over the heat exchanger 112, to thus condense water vapor from the air if the air is vapor laden and decrease the volume of air by cooling it. The condensed water is drained off through the sump and trap 57. The reduction in pressure-volume product maintains a reduced pressure within the sealed heat exchanger enclosure 50 and produces a condition in which power is derived by the flow of ambient air into the sealed heat exchanger enclosure 50 through the air motor 58. Of course, if the air discharged into the enclosure by the rotor 22 is only heated air and not vapor laden the decrease in pressure-volume product is due to primarily the cooling of the heated air within the enclosure 50.

The cooled and dehydrated air within the sealed heat exchanger enclosure 50 is then carried by the rotor 22 until it comes into communication with the port 68 where its pressure is restored adiabatically. The air of restored pressure upon further rotation of the rotor 22 by the motor 66, is discharged to ambient space through the deflecting scroll case 40.

Figure 6:
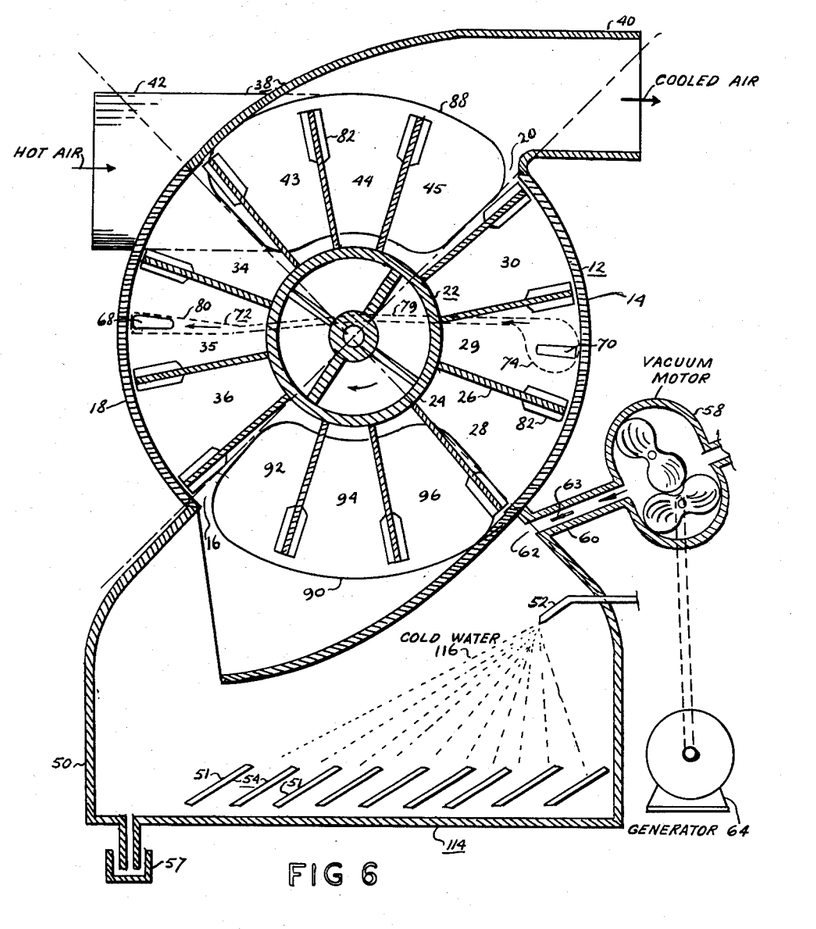
FIG. 6 is a schematic diagram of a heat engine embodying other teachings of this invention and in which means is provided for developing power by cooling hot air by either evaporation and/or gas-to-liquid heat transfer.

FIGURE 6 illustrates a heat engine 114 which functions to deliver power by virtue of vacuum produced by chilling air within the sealed enclosure 50 by a heat exchange liquid 116. The main distinction between the heat engines illustrated by FIGURES 5 and 6 is in the arrangement for cooling the air within the enclosure 50. Like components of FIG. 6 and FIGS. 1 through 3 have been given the same reference characters.

In operation, hot or vapor laden air is drawn through the intake ducts 42 into the intervane compartments 43, 44 and 45, thus replacing the cooled air. Upon rotation of the rotor 22 in the clockwise direction, the ambient air is carried downward past port 70 where adiabatic expansion takes place as previously described.

As the adiabatically expanded air is delivered into the sealed heat exchanger enclosure 50, it is cooled by the heat exchange liquid 116 which is directed onto the evaporating surfaces 51. In the case the ambient air is heated and dry, cooling and resulting volume and pressure decrease takes place partly by evaporation. In the case the ambient air is vapor laden, volume and pressure reduction takes place by cooling the air and condensing vapor from it by heat removed by the specific heat capacity of the liquid 116. In either case the air motor 58 is driven by ambient air flowing through the air motor 58 and the passageway 62 and into the reduced pressure space of enclosure 50 as in the previously described operation for the apparatus of FIG. 5.

Figure 8:
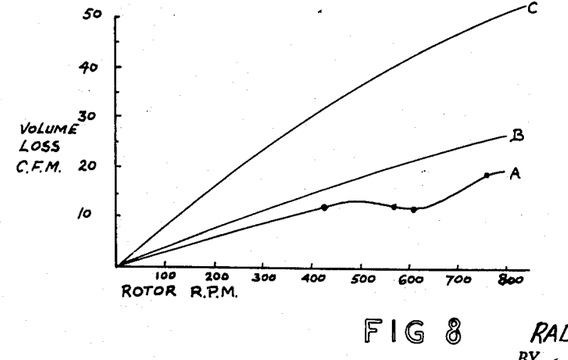
FIG. 8 is a graph illustrating the effectiveness of the pressure recovery when using a venturi pressure inverter connector as illustrated in FIGS. 7A and 7B when applied to the apparatus shown in FIGS. 1 through 6, and FIGS. 9A and 9B are enlarged section views illustrating the venturi pressure inverter interconnecting member shown in FIGS. 1 and 3, as seen from the interconnecting pressure inverter side, and associated components which are similar to those of FIGS. 1 through 3, as well as the cycle of pressure inversion.

FIG. 8 illustrates test data taken from a heat engine operating in accordance with the general features of this invention using a modestly streamlined, ten-inch-long by one and one-quarter-inch diameter, pressure inverter venturi tube, (curve A) as compared with operation that could theoretically have been possible with a cross passage tube that would achieve perfect pressure equalization, (curve B). Curve C shows the cubic feet of gas that would be lost per minute due to unrecovered compression in the rotor of the same device illustrated by curve A if there were no pressure inverter venturi tube connected between outgoing and incoming intervane compartments. Pressure tests were taken on a sealed heat exchanger enclosure 50 when used with a ten vane rotor having a displacement of 1.35 cubic feet per revolution. The pressure in the sealed heat exchanger enclosure 50 was maintained at 55 centimeters of water on the measuring manometer, by means of the air motor 58 acting as an evacuating pump. It is seen by the dip in the curve A that the pressure inverter tube 72 functions to the best advantage at a given speed range. In practice, a pressure equalizing tube (not shown) would show volume loss approaching curve C at higher rotor speeds, instead of following the straight ideal curve B. Thus, the practical necessity of the pressure inverter tube 72 becomes apparent.

The above mentioned tests were taken on a heat engine similar to the heat engine 114 of FIG. 6 except that no water was applied by the spray device 52. Thus, the test data illustrates losses obtained when there is no volume change due to evaporation or condensation. The curves B and C were computed on the same basis.

The most favorable speed of rotation of the rotor 22 is inversely proportional to the number of vanes 26 provided the ratio of the volume of gas within the pressure inverter tube 72 as compared to the volume of gas within the intervane compartments, such as the compartment 29, remains constant. This ratio was five percent in the case of the test data shown by curve A. If a greater pressure in the sealed heat exchanger enclosure 50 is used, the volume ratio should be increased in proportion. If the most favorable design speed is to be changed, the diameter of the pressure inverter tube 72 should be changed in proportion.

The apparatus embodying the teachings of this invention has several advantages. For instance, volumetric and friction losses are maintained at a very low value. This is extremely important in such heat engines operating at small temperature differences between the source and the sink. In addition, it is possible to recover the free energy of dry air by evaporation of water. The free energy can be defined as $$\frac{R}{Hv}\left(\log \frac{1}{r}\right)$$

where
R is the gas constant
$H_v$ is the heat of vaporization of water, and
R is the relative humidity of air before vapor is added to it.

Further, since the vanes 26, of the rotor 22, are fixed relative to the rotor hub 24 and do not touch the rotor housing 12, no lubrication is required except for bearings. Also, considering the size of the apparatus, a large volume of air or gas can be handled. Another advantage is that apparatus constructed in accordance with this invention can operate at low pressure differentials between the atmosphere and the gas within the sealed heat exchanger enclosure 50 or 98.

Since certain changes may be made in the above described apparatus and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a heat engine using a mixture of gases as the working substance, the combination comprising, a rotor having a hub and a plurality of substantially equally spaced vanes fixed to said hub and extending radially out therefrom; a rotor housing having in consecutive order a closed first sector portion, an open second sector portion, a closed third sector portion, and an open fourth sector portion which is disposed to receive gas from ambient space and discharge gas to ambient space, said rotor housing being so disposed around said rotor as to be in close proximity to all of the peripheral edges of said plurality of vanes as they in operation rotate into said closed first sector portion and into said closed third sector portion to thus successively enclose incoming intervane compartments in said closed first sector portion and successively enclose outgoing intervane compartments in said closed third sector portion; a first port in said closed first sector portion of said rotor housing in successive communication with said incoming intervane compartments; a second port in said closed third sector portion of said rotor housing in successive communication with said outgoing intervane compartments; an interconnecting member having a streamlined constriction in the midsection so formed to define a venturi pressure inverter passageway, one end of said interconnecting member being connected to said housing so as to be in communication with said first port and the other end of said interconnecting member being connected to said housing so as to be in communication with said second port, to thus effect a rapid pulsating transfer of gas through said interconnecting member and between said incoming and said outgoing intervane compartments, to thereby effect the desired adiabatic compression and adiabatic expansion in said incoming and outgoing intervane compartments; means for preventing the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; a sealed heat exchanger enclosure so enclosing said rotor housing at said open second sector portion that said enclosure can receive gas from said incoming intervane compartments; means for changing the heat content and density of said enclosed gas to thus effect such a pressure-volume product change in said gas within said enclosure that the amount of gas leaving said enclosure by way of said outgoing intervane compartments will be different from the amount of gas entering said enclosure by way of said incoming intervane compartments; means for converting the energy of said difference in pressure-volume product into mechanical power; and means for effecting rotation of said vaned rotor.

2. In a heat engine, the combination comprising, a rotor having a hub and a plurality of substantially equally spaced vanes fixed to said hub and extending radially out therefrom; a rotor housing having in consecutive order a closed first sector portion, an open second sector portion, a closed third sector portion and an open fourth sector portion, said rotor housing being so disposed around said rotor as to be in close proximity to the peripheral edges of said vanes as they in operation rotate into said closed first sector portion and into said closed third sector portion to thus successively enclose and outgoing enclosed incoming and outgoing enclosed intervane compartments in said closed first sector portion and successively enclose outgoing intervane compartments in said closed third sector portion; a first port in said closed first sector portion of said rotor housing in successive communication with said incoming intervane compartments; a second port in said closed third sector portion of said rotor housing in successive communication with said outgoing intervane compartments; an interconnecting member so constructed as to define a venturi, having a central section, which functions as a pressure inverter, with the intake section of said interconnecting member connected to said rotor housing so as to be in communication with said second port and with said intake section converging eccentrically with respect to said second port into said central section and with the outgoing section of said interconnecting member highly streamlined and divergent and connected to said rotor housing so as to be in communication with said first port, to thus effect a rapid pulsating transfer of gas from said outgoing intervane compartments to said incoming intervane compartments with a minimum of flow of gas in the reverse direction through said interconnecting member, so that gas within said outgoing intervane compartments is adiabatically expanded and gas within said incoming intervane compartments is adiabatically compressed; a closing member on each of said vanes and carried thereby so as to prevent the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; an ambient manifold, including a separate discharge portion and intake portion having a precooler, open to ambient space and connected to said rotor housing at said open fourth sector portion so that gas from said outgoing intervane compartments is discharged through said separate discharge portion to said ambient space and a new charge of precooled gas is delivered through said separate intake portion to said incoming intervane compartments; a sealed heat exchanger enclosure having evaporating surfaces and being so connected to said rotor housing at said open second sector portion that said enclosure can receive said adiabatically compressed gas from said incoming intervane compartments so that said adiabatically compressed gas impinges on said evaporating surfaces; means for directing heated liquid onto said evaporating surfaces to effect an increase in the heat and vapor content of the gas to thus effect a pressure and volume increase in said gas within said enclosure; means for converting the energy of the excess pressure-volume product of said gas within said enclosure into mechanical power, and means for effecting rotation of said vaned rotor.

3. In a heat engine, the combination comprising, a rotor having a hub and a plurality of substantially equally spaced vanes fixed to said hub and extending radially out therefrom; a rotor housing having in consecutive order a closed first sector portion, an open second sector portion, a closed third sector portion and an open fourth sector portion, said rotor housing being so disposed around said rotor as to be in close proximity to the peripheral edges of said vanes as they in operation rotate into said closed first sector portion and into said closed third sector portion to thus successively and outgoing enclose incoming and outgoing enclosed intervane compartments in said closed first sector portion and successively enclose outgoing intervane compartments in said closed third sector portion; a first port in said closed first sector portion of said rotor housing in successive communication with said incoming intervane compartments; a second port in said closed third sector portion of said rotor housing in successive communication with said outgoing intervane compartments; an interconnecting member so constructed as to define a venturi, having a central section, which functions as a pressure inverter, with the intake section of said interconnecting member connected to said rotor housing so as to be in communication with said second port and with said intake section converging eccentrically with respect to said second port into said central section and with the outgoing section of said interconnecting member highly streamlined and divergent and connected to said rotor housing so as to be in communication with said first port, to thus effect a rapid pulsating transfer of gas from said outgoing intervane compartments to said incoming intervane compartments with a minimum of flow of gas in the reverse direction through said interconnecting member, so that gas within said outgoing intervane compartments is adiabatically expanded and gas within said incoming intervane compartments is adiabatically compressed; closing members on each of said vanes and carried thereby so as to prevent the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; an ambient manifold, including a discharge portion and an intake portion, open to ambient space and connected to said rotor housing at said open fourth sector portion so that gas from said outgoing intervane compartments is discharged through said discharge portion to said ambient space and a new charge of gas is delivered to said incoming intervane compartments through said intake portion; a sealed heat exchanger enclosure having evaporating surfaces and being so connected to said rotor housing at said open second sector portion that said enclosure can receive said adiabatically compressed gas from said incoming intervane compartments so that said adiabatically compressed gas impinges on said evaporating surfaces; means for directing liquid chemical absorbent onto said evaporating surfaces and into contact with said gas received into said enclosure from said incoming intervane compartments to thereby heat the gas within said enclosure by chemical action and thus effect a pressure and volume increase in the gas within said enclosure; means for converting the energy of the excess pressure-volume product of the gas within said enclosure into mechanical power; and means for effecting rotation of said vaned rotor.

4. In a heat engine, the combination comprising, a rotor having a hub and a plurality of substantially equally spaced vanes fixed to said hub and extending radially out therefrom; a rotor housing having in consecutive order a closed first sector portion, an open second sector portion, a closed third sector portion and an open fourth sector portion, said rotor housing being so disposed around said rotor as to be in close proximity to the peripheral edges of said vanes as they in operation rotate into said closed first sector portion and into said closed third sector portion to thus successively enclose outgoing enclosed incoming and outgoing enclosed intervane compartments in said closed first sector portion and successively enclose outgoing intervane compartments in said closed third sector portion; a first port in said closed first sector portion of said rotor housing in successive communication with said incoming intervane compartments; a second port in said closed third sector portion of said rotor housing in successive communication with said outgoing intervane compartments; an interconnecting member so constructed as to define a venturi, having a central section, which functions as a pressure inverter, with the intake section of said interconnecting member connected to said rotor housing so as to be in communication with said second port and with said intake section converging eccentrically with respect to said second port into said central section and with the outgoing section of said interconnecting member highly streamlined and divergent and connected to said rotor housing so as to be in communication with said first port, to thus effect a rapid pulsating transfer of gas from said outgoing intervane compartments to said incoming intervane compartments with a minimum of flow of gas in the reverse direction through said interconnecting member, so that gas within said outgoing intervane compartments is adiabatically expanded and gas within said incoming intervane compartments is adiabatically compressed; a closing member on each of said vanes and carried thereby so as to prevent the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; an ambient manifold, including a discharge portion and an intake portion, open to ambient space and connected to said rotor housing at said open fourth sector portion so that gas from said outgoing intervane compartments is discharged through said discharge portion to said ambient space and a new charge of gas is delivered to said incoming intervane compartments through said intake portion; a sealed heat exchanger enclosure being so connected to said rotor housing at said open second sector portion that said enclosure can receive said adiabatically compressed gas from said incoming intervane compartments; means for directing liquid fuel into said enclosure so that in operation the gas within said enclosure is heated by combustion to thus effect a pressure and volume increase in the gas within said enclosure; means for converting the energy of the excess pressure-volume product of the gas within said enclosure into mechanical power; and means for effecting rotation of said vaned rotor.

5. In a heat engine, the combination comprising, a rotor having a hub and a plurality of substantially equally spaced vanes fixed to said hub and extending radially out therefrom; a rotor housing having in consecutive order a closed first sector portion, an open second sector portion, a closed third sector portion and an open fourth sector portion, said rotor housing being so disposed around said rotor as to be in close proximity to the peripheral edges of said vanes as they in operation rotate into said closed first sector portion and into said closed third sector portion to thus successively enclose incoming intervane compartments in said closed first sector portion and successively enclose outgoing intervane compartments in said closed third sector portion; a first port in said closed first sector portion of said rotor housing in successive communication with said incoming intervane compartments; a second port in said closed third sector portion of said rotor housing in successive communication with said outgoing intervane compartments; an interconnecting member so constructed as to define a venturi, having a central section, which functions as a pressure inverter, with the intake section of said interconnecting member connected to said rotor housing so as to be in communication with said second port and with said intake section converging eccentrically with respect to said second port into said central section and with the outgoing section of said interconnecting member highly streamlined and divergent and connected to said rotor housing so as to be in communication with said first port, to thus effect a rapid pulsating transfer of gas from said outgoing intervane compartments to said incoming intervane compartments with a minimum of flow of gas in the reverse direction through said interconnecting member, so that gas within said outgoing intervane compartments is adiabatically expanded and gas within said incoming intervane compartments is adiabatically compressed; a closing member on each of said vanes and carried thereby so as to prevent the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; an ambient manifold, including a discharge portion and an intake portion, open to ambient space and connected to said rotor housing at said open fourth sector portion so that gas from said outgoing intervane compartments is discharged through said discharge portion to said ambient space and a new charge of gas is delivered to said incoming intervane compartments through said intake portion; a sealed heat exchanger enclosure having disposed therewithin a reaction chamber for receiving a solid reactant and being so connected to said rotor housing at said open second sector portion that said enclosure can receive said adiabatically compressed gas from said incoming intervane compartments whereby reaction between said solid reactant and said received gas takes place with resulting heating and expansion of said received gas within said enclosure under increased pressure; means for admitting said solid reactant to said enclosure and into said reaction chamber; means for converting the energy of the excess pressure-volume product of the modified gas within said enclosure into mechanical power; and means for effecting rotation of said vaned rotor.

6. In a heat engine, the combination comprising, a rotor having a hub and a plurality of substantially equally spaced vanes fixed to said hub and extending radially out therefrom; a rotor housing having in consecutive order a closed first sector portion, an open second sector portion, a closed third sector portion and an open fourth sector portion, said rotor housing being so disposed around said rotor as to be in close proximity to the peripheral edges of said vanes as they in operation rotate into said closed first sector portion and into said closed third sector portion to thus successively enclose and outgoing enclosed incoming intervane compartments in said closed first sector portion and successively enclose outgoing intervane compartments in said closed third sector portion; a first port in said closed first sector portion of said rotor housing in successive communication with said incoming intervane compartments; a second port in said closed third sector portion of said rotor housing in successive communication with said outgoing intervane compartments; an interconnecting member so constructed as to define a venturi, having a central section, which functions as a pressure inverter, with the intake section of said interconnecting member connected to said rotor housing so as to be in communication with said second port and with said intake section converging eccentrically with respect to said second port into said central section and with the outgoing section of said interconnecting member highly streamlined and divergent and connected to said rotor housing so as to be in communication with said first port, to thus effect a rapid pulsating transfer of gas from said outgoing intervane compartments to said incoming intervane compartments with a minimum of flow of gas in the reverse direction through said interconnecting member, so that gas within said outgoing intervane compartments is adiabatically expanded and gas within said incoming intervane compartments is adiabatically compressed; a closing member on each of said vanes and carried thereby so as to prevent the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; an ambient manifold, including a discharge portion and an intake portion, open to ambient space and connected to said rotor housing at said open fourth sector portion so that gas from said outgoing intervane compartments is discharged through said discharge portion to said ambient space and a new charge of gas is delivered to said incoming intervane compartments through said intake portion; a sealed heat exchanger enclosure having disposed therewithin a reaction chamber for receiving a solid fuel and being so connected to said rotor housing at said open second sector portion that said enclosure can receive said adiabatically compressed gas from said incoming intervane compartments whereby combustion of said solid fuel takes place with resulting heating and expansion of the gas within said enclosure under increased pressure; means for admitting said solid fuel to said enclosure and into said reaction chamber and for rejecting waste products from said enclosure, heat exchanger means disposed within said enclosure for removing the excess heat due to said combustion that is more than necessary to heat the gas within said enclosure; means for converting the energy of the excess pressure-volume product of the gas and combustion products within said enclosure into mechanical power; and means for effecting rotation of said vaned rotor.

7. In a heat engine, the combination comprising a rotor having a hub and a plurality of substantially equally spaced vanes fixed to said hub and extending radially out therefrom; a rotor housing having in consecutive order a closed first sector portion, an open second sector portion, a closed third sector portion and an open fourth sector portion, said rotor housing being so disposed around said rotor as to be in close proximity to the peripheral edges of said vanes as they in operation rotate into said closed first sector portion and into said closed third sector portion to thus successively enclose incoming intervane compartments in said closed first sector portion and successively enclose outgoing intervane compartments in said closed third sector portion; a first port in said closed first sector portion of rotor housing in successive communication with said incoming intervane compartments; a second port in said closed third sector portion of said rotor housing in successive communication with said outgoing intervane compartments; an interconnecting member so constructed as to define a venturi, having a central section, which functions as a pressure inverter, with the intake section of said interconnecting member connected to said rotor housing so as to be in communication with said first port and with said intake section converging eccentrically with respect to said first port into said central section and with the outgoing section of said interconnecting member highly streamlined and divergent and connected to said rotor housing so as to be in communication with said second port, to thus effect a rapid pulsating transfer of gas from said incoming intervane compartments to said outgoing intervane compartments with a minimum flow of gas in the reverse direction through said interconnecting member, so that gas within said incoming intervane compartments is adiabatically expanded and gas within said outgoing intervane compartments is adiabatically compressed; a enclosing member on each of said vanes and carried thereby so as to prevent the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; an ambient manifold, including a discharge portion and an intake portion, open to ambient space and connected to said rotor housing at said open fourth sector portion so that gas from said outgoing intervane compartments is discharged through said discharge portion to said ambient space and a new charge of gas is delivered to said incoming intervane compartments through said intake portion; a sealed heat exchanger enclosure having a heat exchanger disposed therewithin for cooling of gas and being so connected to said rotor housing at said open second sector portion that said enclosure can receive said adiabatically expanded gas from said incoming intervane compartments so that said adiabatically expanded gas impinges on said heat exchanger thus cooling said adiabatically expanded gas and thereby reducing the pressure-volume product of the gas within said enclosure so as to maintain a partially vacuum within said enclosure; means for admitting ambient air into said enclosure to thereby develop mechanical power; and means for effecting rotation of said vaned rotor.

8. In a heat engine, the combination comprising, a rotor having a hub and a plurality of substantially equally spaced vanes fixed to said hub and extending radially out therefrom; a rotor housing having in consecutive order a closed first sector portion, an open second sector portion, a closed third sector portion and an open fourth sector portion, said rotor housing being so disposed around said rotor as to be in close proximity to the peripheral edges of said vanes as they in operation rotate into said closed first sector portion and into said closed third sector portion to thus successively enclose and outgoing enclosed incoming and outgoing enclosed intervane compartments in said closed first sector portion and successively enclose outgoing intervane compartments in said closed third sector portion; a first port in said closed first sector portion of said rotor housing in successive communication with said incoming intervane compartments; a second port in said closed third sector portion of said rotor housing in successive communication with said outgoing intervane compartments; an interconnecting member so constructed as to define a venturi, having a central section, which functions as a pressure inverter, with the intake section of said interconnecting member connected to said rotor housing so as to be in communication with said first port and with said intake section converging eccentrically with respect to said first port into said central section and with the outgoing section of said interconnecting member highly streamlined and divergent and connected to said rotor housing so as to be in communication with said second port, to thus effect a rapid pulsating transfer of gas from said incoming intervane compartments to said outgoing intervane compartments with a minimum flow of gas in the reverse direction through said interconnecting member, so that gas within said outgoing intervane compartments is adiabatically compressed and gas within said incoming intervane compartments is adiabatically expanded; a closing member on each of said vanes and carried thereby so as to prevent the direct passage of gas between adjacent incoming intervane compartments and between adjacent outgoing intervane compartments during that period when the vane, of said plurality of vanes, which separates said adjacent incoming intervane compartments is in the position of said first port and during that period when the vane, of said plurality of vanes, which separates said adjacent outgoing intervane compartments is in the position of said second port; an ambient manifold, including a discharge portion and an intake portion, open to ambient space and connected to said rotor housing at said open fourth sector portion so that gas from said outgoing intervane compartments is discharged through said discharge portion to said ambient space and a new charge of gas is delivered to said incoming intervane compartments through said intake portion; a sealed heat exchanger enclosure having therewithin heat exchanger surfaces and being so connected to said rotor housing at said open second sector portion that said enclosure can receive said adiabatically expanded gas from said incoming intervane compartments; means for directing heat exchange liquid onto said heat exchanger surfaces so that said received gas is cooled with a resultant decrease in pressure-volume product to thus establish a partial vacuum within said enclosure; means for admitting ambient gas into said enclosure to thereby develop mechanical power; and means for effecting rotation of said vaned rotor.

References Cited in the file of this patent

UNITED STATES PATENTS

| | | |
|---|---|---|
| 1,073,717 | Stachel | Sept. 23, 1913 |
| 2,653,448 | Kupka | Sept. 29, 1953 |